May 30, 1939.  G. L. USSELMAN  2,160,466
OSCILLATION GENERATOR AND FREQUENCY MODULATOR
Filed Oct. 5, 1935  2 Sheets—Sheet 1

INVENTOR.
G. L. USSELMAN
BY
*H. S. Grover*
ATTORNEY.

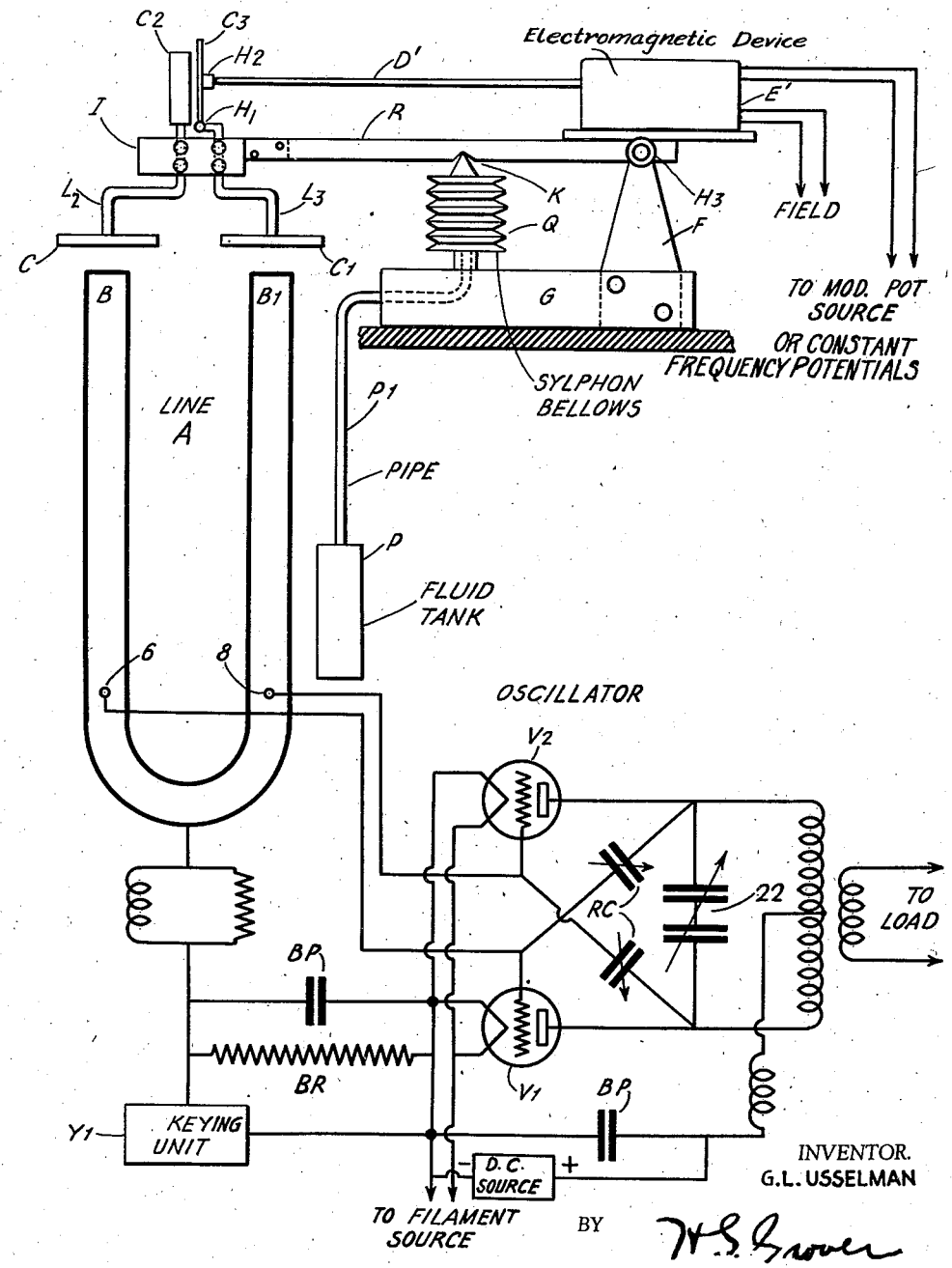

Patented May 30, 1939

2,160,466

UNITED STATES PATENT OFFICE 2,160,466

OSCILLATION GENERATOR AND FREQUENCY MODULATOR

George Lindley Usselman, Port Jefferson, N. Y., assignor to Radio Corporation of America, a corporation of Delaware Application October 5, 1935, Serial No. 43,694

21 Claims. (Cl. 179—171)

This invention relates to a novel circuit arrangement for producing high frequency oscillations of substantially constant amplitude and normally substantially constant frequency, and for modulating the frequency of the oscillations produced in a novel manner at signal frequency. The signal frequency may be replaced by oscillations of constant frequency to produce a frequency wobbled wave for diversity effect. In the latter case, the frequency modulated wave will be keyed to carry intelligence.

In a modification of my system, I provide means for compensating any tendency for the normal frequency generated to shift due to physical or electrical changes, or both, in the circuit elements. This compensating means may form a part of or cooperate with the means for frequency modulating the oscillations generated.

Figure 1:
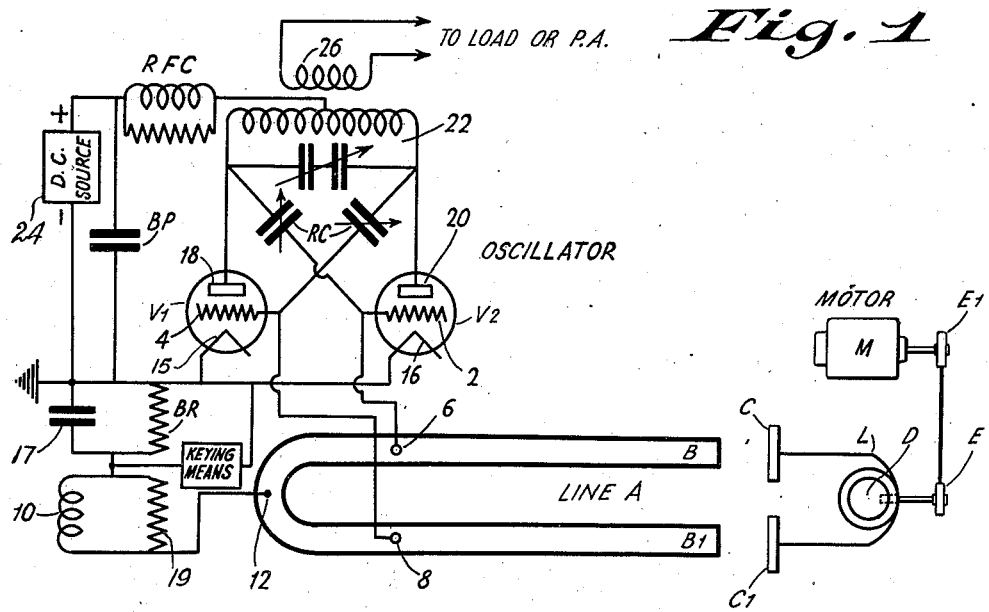
Figure 2:
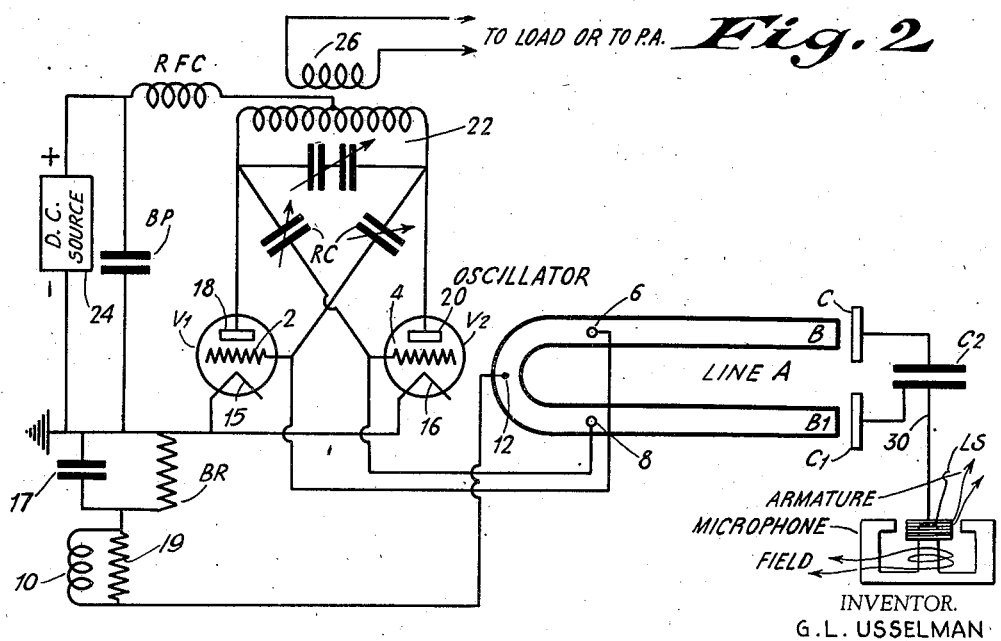

In describing my invention, reference will be made to the drawings, throughout which like reference characters indicate like parts insofar as possible, and in which: Figures 1, 2 and 3 show diagrammatically the elements of the generator and frequency modulator circuit arranged in accordance with my invention. The modification of Fig. 3 also includes means for compensating any tendency of the generated frequency to drop due to room temperature changes or circuit changes caused by operation.

Referring to Figs. 1, 2 and 3, a pair of thermionic triodes $V_1$, $V_2$ have their control grids 2, 4 respectively connected as shown to points 6 and 8 on the resonant line A. The line A may be of any form, but preferably is U-shaped, as shown, having two legs B and $B_1$. The alternating current grid circuit is completed by way of an inductive reactance 10, connecting the symmetrical point 12 on A to the cathodes 15 and 16 of the tubes by way of a bypass condenser 17. The direct current grid circuit is completed by way of the bias resistor BR and inductance 10 shunted by a resistance 19. The anodes 18 and 20 of the tubes $V_1$ and $V_2$ are connected as shown in push-pull relation by a tuned circuit 22 comprising a parallel inductance and a variable capacity. The direct current anode circuit comprises a choking inductance RFC and a source of potential 24 connected as shown between a point on the inductance of circuit 22 and the cathodes 15, 16. The anodes 18 and 20 of $V_1$ and $V_2$ are connected as shown by way of condensers RC to the control grids 4 and 2, respectively. The purpose of the condensers RC is to provide regeneration between the input and output electrodes and input and output circuits of the tubes, to thereby ensure the production of oscillations in said tubes when they are energized.

The circuits described hereinbefore when energized operate to produce oscillations of substantially constant frequency, as determined by resonant line A, and to supply said oscillations to the anode circuit 22 which may be tuned to the fundamental frequency, e. g., the frequency of the line A or to a harmonic of said frequency. The high frequency oscillations of substantially constant frequency appearing in 22 may be supplied to a load circuit, as for example an antenna system directly or by way of a power supply circuit connected to the coupling inductance 26. The manner in which these oscillations are produced will be understood by one skilled in the art. When the electrodes of the tubes are energized, high frequency currents flow therein to produce oscillations in the circuit 22 and in the resonant line A. The oscillations are transferred from the line A to the grid electrodes of the tubes and are repeated and/or amplified in the anode circuit 22. Part of the oscillatory energy in the anode circuit 22 is fed back to the grid electrodes by way of the regenerative condensers RC. Thus, a flywheel effect is produced so that there is a continual transfer of energy from the line A to the circuit 22 and vice versa, thereby ensuring the production of oscillations of substantially constant amplitude and frequency in the oscillator. In practice each leg of A may have an effective electrical length substantially equal to one quarter of the wave length of the oscillations being generated so that both legs of A have a combined effective electrical length substantially equal to one half of a wave length. The manner in which the tubes and line A cooperate to produce oscillations has been described in detail in Hansell U. S. application Ser. No. 692,092, filed Oct. 4, 1933. The generator described hereinbefore is useful at all frequencies and is particularly useful in short wave signalling. In this generator, the triodes $V_1$, $V_2$ may be replaced by tubes having a greater number of electrodes, such as screen grid tubes or pentode tubes.

The frequency of the oscillations generated by the generators is determined by the capacitive and inductive reactance of the line A. I modulate the frequency of the oscillations generated by working on the capacitive or inductive reactance of the line A, or both. In Figs. 1 and 2, I have coupled a pair of condenser plates C and $C_1$ electrostatically to the legs of the U-shaped line A. The condenser plates C and $C_1$ are coupled together in Fig. 1 by an inductance L which may be varied and in Fig. 2 by a condenser $C_2$ which may be varied. By varying the inductance L in Fig. 1, I vary the effective impedance of plates C and $C_1$ and inductance L coupled to points B and $B_1$ on the line A. This results in frequency modulation of the oscillations generated in the oscillator. The same result will be obtained in Fig. 2 by varying the capacity $C_2$ which in effect varies the capacity between the legs B and $B_1$ resulting in frequency modulation of the oscillations produced. In Fig. 1, the capacity plates C and $C_1$ are connected by an inductance L which may be varied by an inductor disc D driven by a motor M by way of gearing E and $E_1$. Oscillation or rotation of the disc D in the field of the inductance L varies the effective inductance thereof. The support or bearing for disc D and for the shafts for the gearing have been omitted since they form no part of the present invention. Obviously, the inductor disc D may be driven by a belt or chain, if desirable. Moreover, the motor M may be a voice frequency operated element for driving the disc D.

In Fig. 2, the condenser $C_2$ in series with the condenser plates C and $C_1$ is varied in value by use of a driving means LS connected by a link 30 to one of the plates of $C_2$. The armature winding of this driving unit may be energized by currents characteristic of modulating potentials of any nature from any source. Although I have shown condensers C and $C_1$ coupled to the ends of the lines B and $B_1$, I contemplate coupling these condensers to any suitable spaced points on line A.

In the modification of Fig. 3, the condenser plates C and $C_1$ are mounted as shown on an insulator I, in turn supported on an arm R which is pivoted at $H_3$ in a fixed support F, mounted on a base G. A sylphon bellows Q is connected by a fluid path pipe $P_1$ to a fluid tank P which may be located adjacent the line A, as shown. During operation of the oscillator, the line A may change in temperature and expand. This would tend to lower the frequency of the oscillations generated. The oil in P and $P_1$, however, expands due to the heating of the line A, in turn expanding the bellows Q. This moves the arm R and draws the condenser elements C and $C_1$ away from the line A, thereby decreasing the capacity of said line. This raises the frequency of the oscillations generated back to normal. In the event that the temperature of the line falls below normal, the reverse effect is obtained. This means is effective also to correct any tendency of the oscillations generated to be shifted in frequency due to changes in room temperature. The two condenser elements C and $C_1$ are connected by their supporting elements $L_2$ and $L_3$ to condenser plates $C_3$ and $C_4$, respectively. Condenser element $C_3$ may be fixedly mounted as shown, while condenser element $C_4$ is hinged or pivoted at $H_1$, or it may be a flexible plate and is linked to a movable arm or rod D'. The rod D' may be made of insulating material or have an insulator in series with it. The arm D' is driven by an electromagnetic device E'. The electromagnetic device may have its armature winding connected to a source of signal potentials or to a source of constant frequency oscillations.

The capacity across the line A consists of condensers B—C, $C_2$—$C_3$, and $C_1$—$B_1$. These series condensers may all be made to move up and down as a whole relative to B, $B_1$ by the action of the bellows Q influenced by the fluid in fluid tank P connected to the bellows Q, by fluid condenser $P_1$, to compensate the tendency of the frequency generated to change due to temperature changes affecting the physical dimensions of the line A. The variation of capacity $C_2$, $C_3$ varies the frequency of the oscillations generated in accordance with the modulating potentials by varying the capacity across the line A. This occurs because condensers $C_2$, $C_3$ are in series with condensers B, C and $B_1$, $C_1$. Therefore, an audible signal impressed on E results in a frequency modulated carrier frequency being produced in the oscillator and set up in the circuit 22. As in the prior modifications, this energy output from the oscillator may be delivered directly to a load circuit, or to a load circuit by way of amplifying and frequency multiplying means.

In case it is desired to utilize the oscillator for telegraph signaling, the source of signals may be disconnected from the electromagnetic device and the keying unit in Y may be used. The keying unit in Y may comprise a key manually or remotely controlled, for supplying blocking bias to the grids of the tubes. If the benefits of frequency diversity is desired, in telegraph signaling, electromagnetic device E' may be supplied with oscillations of constant frequency. This helps to reduce fading.

What is claimed is:

1. In a signaling system, an oscillation generator including a U-shaped frequency controlling resonant line having controllable capacitive reactance, and means for varying the effective capacitive reactance of said line at signal frequency for modulating the frequency of the oscillations generated.

2. In a signaling system, an oscillation generator tube having a control electrode and a cathode, a U-shaped frequency controlling resonant line having capacitive reactance connected with the cathode and control electrode of said tube, and means for varying the effective capacitive reactance of said line at signal frequency for modulating the frequency of the oscillations generated.

3. In a signaling system, an oscillation generator including a frequency determining controllable reactance in a resonant circuit, means including a variable portion of said reactance for maintaining the value of said reactance substantially constant irrespective of changes in the temperature thereof, and means cooperating with said portion of said reactance for varying the value of said reactance in accordance with potential variations at signal frequency to vary the frequency of the oscillations generated at signal frequency.

4. In a signaling system, an electron discharge tube oscillation generator having electrodes connected with a frequency controlling reactance, means including a variable portion of said reactance for maintaining the value of said reactance substantially constant irrespective of changes in the temperature thereof, and means cooperating with said last named means for varying the value of said reactance in accordance with potential variations at signal frequency to vary the frequency of the oscillations generated at signal frequency.

5. In a signaling system, an oscillation generator including a U-shaped frequency controlling resonant line having inductive reactance, and means for modulating the frequency of the oscillations generated comprising means for varying the effective inductive reactance of said line at signal frequency.

6. In a signaling system, an oscillation generator tube having a control electrode and a cathode, a U-shaped frequency controlling resonant line having inductive reactance connected with said control electrode and said cathode of said tube, and means for varying the effective inductive reactance of said line at signal frequency for modulating the frequency of the oscillations generated at signal frequency.

7. In a signaling system, an oscillation generator including a frequency controlling resonant line having inductive and capacitive reactance, means for maintaining the value of the capacitive reactance of said line substantially constant irrespective of changes in the temperature thereof, and means cooperating with said last named means for varying the value of said capacitive reactance in accordance with signals.

8. In a signaling system, an oscillation tube having a control electrode, a frequency controlling resonant line having inductive and capacitive reactance connected with said control electrode, means for maintaining the value of one of said reactances of said line substantially constant irrespective of changes in the temperature thereof, and means cooperating with said last named means for varying the value of said one reactance in accordance with signals.

9. In a signaling system in combination, an oscillation generator including a frequency controlling reactance, means for producing changes in said reactance which oppose and compensate changes in said reactance due to temperature variations, for maintaining the value of said reactance substantially constant irrespective of changes in the temperature thereof, means cooperating with said last named means for varying the value of said reactance in accordance with potential variations of constant frequency, and keying means connected to said oscillation generator.

10. In a signaling system in combination, an oscillation generator tube having a control electrode and cathode, a frequency controlling reactance connected with said control electrode and cathode, means for producing changes in said reactance which oppose and compensate changes in said reactance due to temperature variations, for maintaining the value of said reactance substantially constant irrespective of changes in the temperature thereof, and means cooperating with said last named means for varying the value of said reactance in accordance with potential variations of constant frequency, and keying means connected to said oscillation generator.

11. In a signaling system, a thermionic tube having a control grid, a cathode and an anode, a tuned circuit connected to the anode and cathode of said tube, a frequency stabilizing U-shaped line coupled to the control grid and cathode of said tube, means for applying potentials to the electrodes of said tube to produce therein and in said circuit oscillations of a frequency determined by the reactance of said frequency stabilizer line, a capacity coupled between spaced points on said line, and means for varying said capacity at signal frequency for modulating the frequency of said oscillations at signal frequency.

12. A system as recited in claim 11 wherein said tuned circuit is tuned to a harmonic of the oscillations produced.

13. In a signaling system, a tube having a control grid a cathode and an anode, a tuned circuit connected to the anode and cathode of said tube, a frequency stabilizing U-shaped line coupled to the control grid and cathode of said tube, means for coupling the control grid of said tube to the anode of said tube, means for applying potentials to the electrodes of said tube to produce therein and in said circuit oscillations of a frequency determined by the reactance of said line, and means for modulating the frequency of said oscillations at signal frequency comprising, a capacity coupled between spaced points on said line and means for varying said capacity at signal frequency.

14. A system as recited in claim 13 wherein said tuned circuit is tuned to a harmonic of the oscillations generated.

15. In a signaling system, an oscillation generator comprising a pair of thermionic tubes having coupled anodes and control grids and a resonant U-shaped line connected with the control grids of said tubes to stabilize the frequency of the oscillations generated, means for preventing physical changes in said line caused by changes in the operating temperature thereof from affecting the frequency of the oscillations generated comprising a fluid tank adjacent said line, a bellows fluid flow connected to said tank, a movable condenser plate coupled to a point on said line, a movable condenser plate coupled to a second point on said line spaced from said first point, a mechanical link between one of said movable condenser plates and said bellows, and an element controlled by modulating potentials coupled to one of said movable condenser plates.

16. In a signaling system an oscillation generator comprising a pair of thermionic tubes each having an anode and a control grid and a resonant U-shaped line connected with the control grids of said tubes to stabilize the frequency of the oscillations generated, a load circuit coupled to the anodes of said tubes, means for preventing physical changes in said line caused by changes in the operating temperature thereof from affecting the frequency of the oscillations generated comprising a fluid tank adjacent said line, a bellows fluid flow connected to said tank, a movable condenser plate coupled to a point on said line, a movable condenser plate coupled to a second point on said line spaced from said first point, a mechanical link between said movable condenser plates and said bellows, a variable capacity connected between said condenser plates, and means for varying said capacity at signal frequency.

17. In a signaling system, a pair of thermionic tubes each having a control grid, a cathode and an anode, a tuned circuit coupling the anodes of said tubes in push-pull relation, neutralizing condensers cross-connecting the anodes and control grids of said tubes, a frequency stabilizing U-shaped resonant line, circuits connecting the control grids of said tubes to spaced points on said line, means for applying potentials to the electrodes of said tubes to produce therein and in said circuit oscillations of a frequency determined by the dimensions of said line, a capacity coupled between spaced points on said line, and means for varying said capacity at signal frequency for modulating the frequency of said oscillations at signal frequency.

18. In a signaling system, a pair of thermionic tubes each having a control grid, a cathode and an anode, a circuit coupling the anodes of said tubes in push-pull relation, neutralizing condensers cross-connecting the anodes and control grids of said tubes, a frequency stabilizing U-shaped resonant line, circuits connecting the control grids of said tubes to spaced points on said line, means for applying potentials to the electrodes of said tubes to produce therein oscillations of a frequency determined by the dimensions of said line, a capacity coupled between spaced points on said line, means for varying said capacity at signal frequency, and means for varying said capacity in accordance with variations in the physical dimensions of said line.

19. In a system for producing high frequency oscillations and controlling the frequency of the oscillations, an oscillation generator having a frequency controlling resonant line, conductive plates capacitively coupled to spaced points on said line, a variable inductance connected between said plates, and means for varying said inductance thereby varying the reactance of said line and controlling the frequency of the oscillations generated.

20. In a signaling system, an oscillation generator including electron discharge devices each having a control electrode, a U-shaped frequency controlling resonant line the length of which is a fraction of the wave length of the oscillations to be generated, connections between spaced points on said line and said control electrodes, reactive means coupled between spaced points on said line, and means for varying said reactive means at signal frequency for modulating the frequency of the oscillations generated.

21. In a signaling system the combination of an electron discharge device having an anode, a cathode, and a control electrode, an alternating current output circuit connected with said anode and cathode, a resonant line, connections between spaced points on said line and the control electrode and cathode of said device, means for varying the effective reactance of said line in accordance with changes in temperature thereof to maintain the effective reactance of said line substantially constant, and means for varying the effective reactance of said line in accordance with signals.

GEORGE LINDLEY USSELMAN.